April 15, 1969     M. E. LARKIN     3,438,085
APPARATUS FOR DECORATING AND MOLDING ARTICLES
Filed July 11, 1966
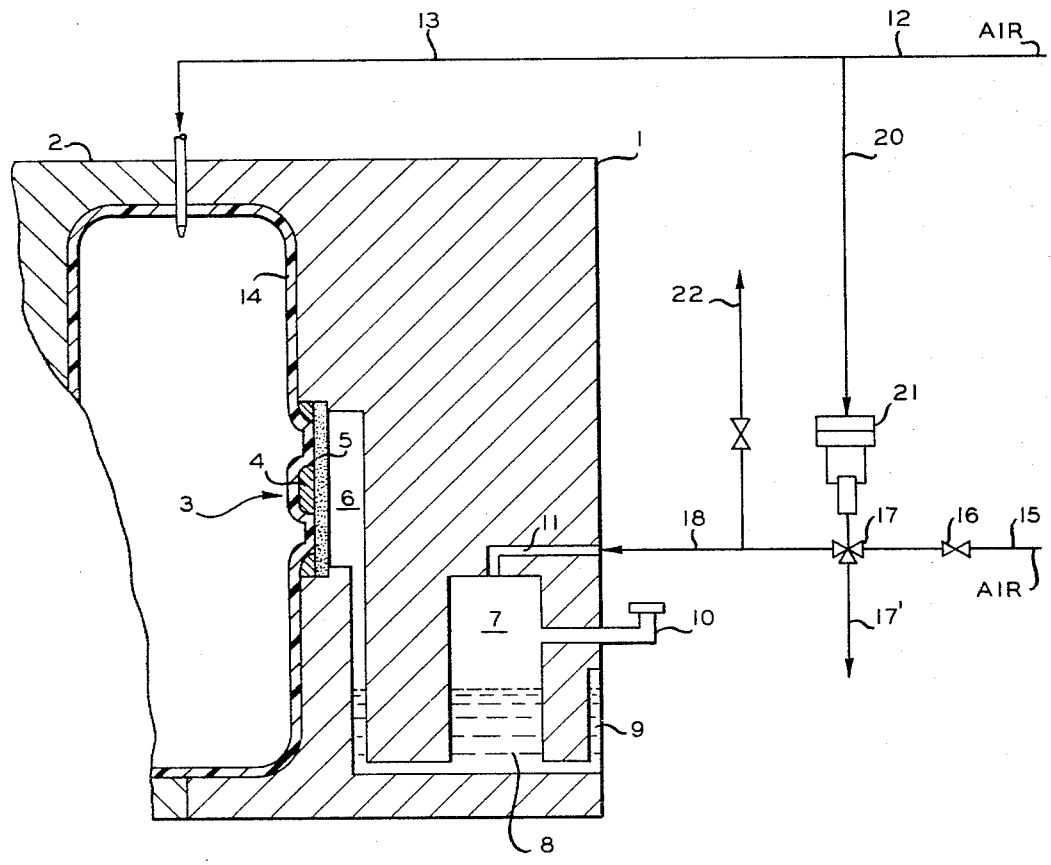
INVENTOR
M. E. LARKIN
BY *Young + Quigg*
ATTORNEYS

United States Patent Office 3,438,085
Patented Apr. 15, 1969

3,438,085
APPARATUS FOR DECORATING AND MOLDING
ARTICLES
Mark E. Larkin, Bartlesville, Okla., assignor to Phillips
Petroleum Company, a corporation of Delaware
Filed July 11, 1966, Ser. No. 564,400
Int. Cl. B29c 1/00; B44d 5/06
U.S. Cl. 18—5      5 Claims This invention relates to an apparatus for decorating molded articles.

Heretofore in molding plastic bottles by conventional apparatus such as blow molding, a mold has been provided with an embossing plate which has protrusions and recesses in a desired amount so as to emboss designs of the plate in three dimensions on the molded article. Heretofore the embossing plate has been backed up with a felt pad which was supplied with a dye from a gravity feed reservoir so that the felt pad was maintained full of ink at all times. When the reservoir on this type of apparatus was full of dye, the pressure in some cases would become great enough to cause dye to run out of the felt into the mold between molding cycles. Also, in some cases the hot, just-molded article causes the dye on the felt pad to dry on the surface of the pad and clog same. Further, the resilient felt pad does not provide a substantially uniform surface at all times in that it gives more to localized pressures in certain spots thereby providing an irregular surface on embossed parts of the molded article. Also, the embossing plate being unsupported except for the felt pad requires the use of stencil type, split lettering with similarly split figures and the spliting effect detracts aesthetically from the resulting decoration on the molded article.

According to this invention there is provided apparatus for pressure molding a formable, dyeable material wherein the embossing plate is supported by a porous metal plate inserted between the embossing plate and the reservoir, the reservoir is located relative to the porous plate so that a dye in the reservoir must be pressurized to move dye from the reservoir into contact with the porous plate and the formed material, and pressurizing means is provided for moving dye from the reservoir.

By this invention the reservoir can be maintained liquid full at all times without risk of dye leakage into the mold between molding cycles. Further, by the use of pressurized dye the porous support plate for the embossing plate is cleaned with each dyeing operation, so that the porous plate is not clogged by contact with hot just-formed material. Also, because the porous plate is a rigid supporting member it provides a uniformly flat surface which is not subject to forming an irregularly embossed surface due to localized stresses that may occur during the molding operation. Also, because the embossing plate is supported the need for split letters or figures is obviated thereby allowing the use of more aesthetically desirable lettering and decoration.

Further, this invention allows the decoration of one or a plurality of sides of the molded article at substantially the same time. The invention also allows for the decoration of substantially any shape article that can be pressure molded and at the same time eliminates conventional, separate marking and drying equipment as well as the maintenance of that equipment. Also, because the dye is pressurized, the pressure thereon can be varied to vary the penetration of the dye into the molded article thereby tailoring the dyeing technique to the particular article being molded and also providing a more durable mark than heretofore obtained. Further, by the substantially contemporaneous molding and marking of the article, a higher throughput is effected notwithstanding the fact that a considerable economic saving is realized by the elimination of separate marking apparatus, handling, and the like.

Accordingly, it is an object of this invention to provide a new and improved apparatus for marking molded articles.

Other aspects, objects, and the several advantages of this invention will be apparent to those skilled in the art from the description, drawings, and appended claims.

The drawing shows a system embodying this invention.

In the drawing there is shown one-half of a blow molding mold 1, the other half 2 being shown only in part. Mold 1 has an aperture 3 in which is mounted an embossing plate 4 which has a series of protrusions and recesses about which the formed material 14 is pressed to give a three-dimensional design to the formed material. Porous support plate 5 is carried adjacent embossing plate 4 to support plate 4 against the molding pressure to which material 14 is subjected so that a design which would materially structurally weaken plate 4 can still be employed. Plate 5 can be formed of any structurally strong material such as sintered metal, two primary requirements being that plate 5 is structurally strong yet porous enough to allow the passage of dye from the reservoir into the recesses of embossing plate 4 and therefore into contact with the formed material 14. Plate 5 can be formed from the same metal as mold 1 except that the plate is formed by subjecting a plurality of particles of that metal to an elevated temperature and elevated pressure in a conventional powder metallurgy process to cause adhesion of the metal particles at their points of contact with other metal particles but yet retain pores formed where the metal particles are not in touch with one another. Another technique for achieving this would be the bonding of a zinc alloy to the porous material and utilization of conventional photoengraving.

Aperture 3, recesses of embossing plate 4, and porous plate 5 are all in open contact through conduit 6 with reservoir 7 which contains a supply of dye 8. By dye, what is covered by this invention is any fluid, preferably a liquid, which can be impressed upon the formed material and be retained by same. Thus, dye herein includes any conventional dye, ink, or the like. Dye such as that employed in felt tip markers or fluorescent ink or any similar material can be employed.

Reservoir 7 is equipped with a dye level indicator 9, a filling conduit 10, and a pressurizing conduit 11. Reservoir 7 is located below aperture 3 so that dye will not be in contact with porous plate 5 even when reservoir 7 is liquid full unless the pressure in the reservoir is increased by the passage of a pressuring fluid thereinto through conduit 11.

Pressurized air or other fluid is supplied through lines 12 and 13 to the interior of mold 1 to press material 14 against the mold and thereby form same into the desired article.

Air or other pressurizing fluid for moving dye from reservoir 7 into contact with plate 5 is supplied through line 15, pressure regulating valve 16, three-way, solenoid valve 17, and line 18. Pressure regulating valve 16 is employed to regulate the pressure by which the dye is pressed against formed material 14 and thereby control the degree of penetration of the dye into material 14.

Line 20 openly connects line 12 with pressure switch 21 and pressure switch 21 is operatively connected to solenoid operated valve 17. Pressure switch 21 is adapted to open valve 17, i.e., switch 17 to pass air from 15 into 18, and valve 17 is adapted to automatically return to a normally closed position, i.e., that vents reservoir 7 to the atmosphere through 18 and exhaust port 17'; when valve 21 is deactivated by reduced pressure in line 20.

Valved line 22 is provided to supply pressuring fluid to any other mold portion, e.g., mold 2, which may also contain apparatus similar to that shown in mold 1 thereby allowing the decoration of formed material 14 on more than one side at substantially the same time.

Thus, in operation, a parison is disposed between molds 1 and 2 and blowing air supplied thereto through line 13 which causes the parison to move against the interior of molds 1 and 2 and follow the contours of embossing plate 4. The blow molding air also presses against pressure switch 21 and as the pressure of the blow molding air increases switch 21 opens valve 17, as defined above, and allows pressuring air to enter reservoir 7 thereby pushing dye through conduit 6 and plate 5 into contact with material 14 in the recesses of embossing plate 4. Pressure switch 21 is adjusted so as not to open valve 17 until sufficient pressure has been supplied to the interior of molds 1 and 2 through line 13 to cause material 14 already to be molded against embossing plate 4.

Pressure switch 21 serves a dual function in that it not only assures sequential operation, i.e., forming of the material followed by marking of that material, but also serves as a safety means in that if the parison does not blow or if it ruptures, the pressure in line 20 will not build up to a sufficient magnitude to open valve 17 and therefore no dye will be displaced from reservoir 7 even through the molding cycle has reached the point where the molded article is normally dyed.

This invention is applicable to any suitable pressure molding process, a particularly preferred process being a conventional blow molding operation.

Generally, any formable, dyeable material can be employed in the method and apparatus of this invention. Preferred materials are plastics, preferably thermoplastics. These materials include the polymers of 1-olefins having from 2 to 8 carbon atoms per molecule, polyamides, polyesters, polyvinyl alcohol, acrylic polymers, polyvinyl chloride, polyvinylidene chloride, polyvinyl acetate, mixtures and copolymers thereof, and the like.

The pressure to which the dye reservoir 7 is subjected can vary widely depending upon the type of plate 5 employed and its porosity, as well as the particular type of material being molded and the desired amount of penetration of that material with the dye. Generally, the pressure employed will vary from about 0.1 to 10 p.s.i.g., but it can be lower or higher depending upon the circumstances.

*Example*

A conventional polyethylene blow molding operation is carried out in the apparatus substantially as shown in the drawing employing conventional printer's ink.

A hot, just-extruded, polyethylene parison is passed between molds 1 and 2 and air under a pressure of about 130 p.s.i.g. is introduced into the parison to force it out against the internal walls of molds 1 and 2 and over the contours of embossing plate 4. When the pressure on pressure switch 21 builds up to 130 p.s.i.g. valve 17 is opened and air under a pressure of about 0.3 p.s.i.g. passes from 15 through 18 and 11 and into reservoir 7. The air forces printer's ink 8 through a porous steel plate 5 to mark the polyethylene article just being formed in molds 1 and 2.

The blowing air to line 12 is terminated, pressure switch 21 switches three-way valve 17 so that air from line 15 no longer passes into reservoir 7 but reservoir 7 is vented to the atmosphere through lines 11, 18, and the exhaust port 17' of valve 17. Thus, the printer's ink still in conduit 6 returns to reservoir 7 out of contact with plate 5.

Reasonable variations and modifications are possible within the scope of this disclosure without departing from the spirit and scope thereof.

I claim:

1. In apparatus for pressure molding a formable, dyeable material wherein the material is pressure molded against a mold means, said mold means having at least one aperture in the side thereof carrying at least one apertured embossing plate, said at least one aperture being openly connected to a reservoir means, the improvement comprising a porous support plate for supporting said embossing plate against the molding pressure and carried in between said plate and said reservoir, said reservoir being located relative to said porous plate so that a dye in said reservoir must be pressurized to move said dye into contact with said porous plate, and means for pressuring the interior of said reservoir to froce dye from same into contact with said porous plate.

2. The apparatus according to claim 1 wherein said reservoir is situated below said porous plate so that there is no gravity feed of dye from said reservoir to said porous plate.

3. The apparatus according to claim 1 wherein said porous plate is a metal plate formed from sintered metal particles.

4. The apparatus according to claim 1 wherein said means for pressurizing the interior of said reservoir includes a conduit openly connected to said reservoir, a valve means operatively mounted in said conduit, and pressure means operatively connected to said valve and to the interior of said mold means, said pressure means being adapted to open said valve and allow a pressuring fluid through said conduit into the interior of said reservoir when the pressure in said mold means reaches a predetermined value.

5. The apparatus according to claim 4 wherein said valve is a three-way self-resetting valve whose normal position is that which prevents the passage of pressuring fluid into the interior of reservoir 7 but allows the venting of reservoir 7 to the atmosphere, said pressuring means is a fluid actuated pressure switch openly connected to a conduit which carries pressuring fluid to the interior of said mold means, and said conduit for passing pressurizing fluid into said reservoir has operatively mounted thereon upstream of said three-way valve a separate valve means for regulating the pressure of the pressurizing fluid passing into the interior of the reservoir.

References Cited

UNITED STATES PATENTS

| 2,601,700 | 7/1952 | Pinsky et al. | 18—35 |
| 3,194,857 | 7/1965 | White | 264—94 X |

FOREIGN PATENTS

| 5,736 | 6/1967 | Japan. | |

WILBUR L. McBAY, *Primary Examiner.*

U.S. Cl. X.R.

264—94